(No Model.)
D. J. DAVIS.
CENTRIFUGAL CREAMER.
No. 523,885. Patented July 31, 1894.
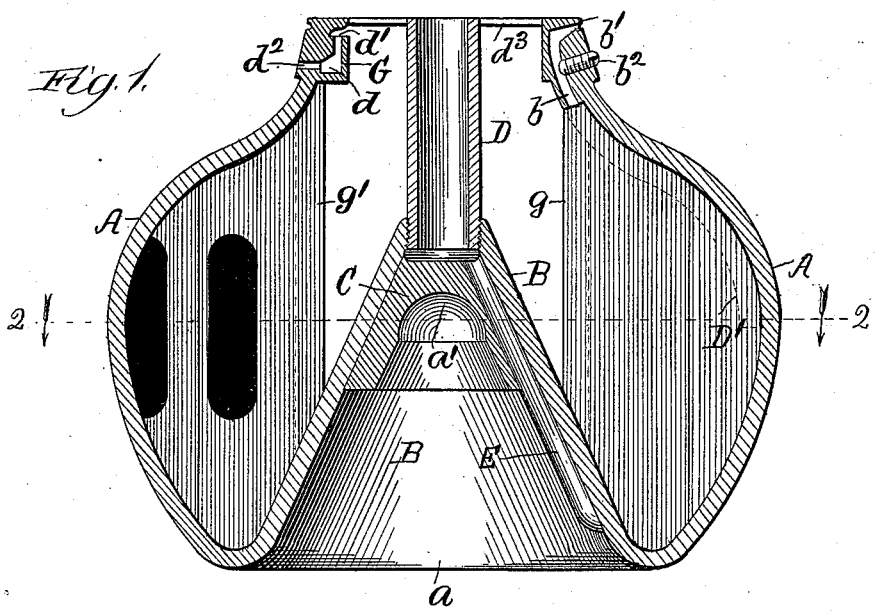
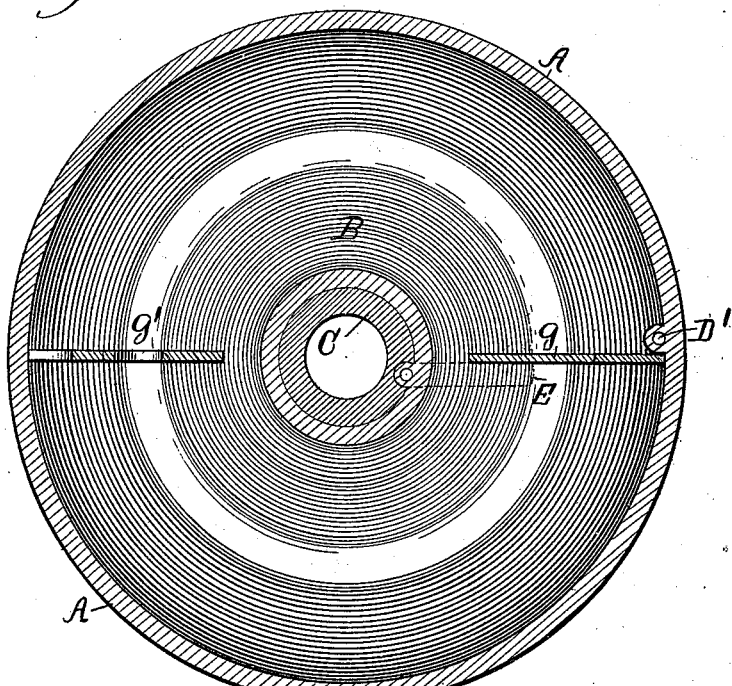
Witnesses:
Chas. E. Gaylord,
Clifford H. White.
Inventor:
D. J. Davis.
By L. B. Coupland & Co.
Attys.
THE NORRIS PETERS CO., PHOTO-LITHO., WASHINGTON, D. C.

UNITED STATES PATENT OFFICE.

DANIEL J. DAVIS, OF CHICAGO, ILLINOIS.

CENTRIFUGAL CREAMER.

SPECIFICATION forming part of Letters Patent No. 523,865, dated July 31, 1894.

Application filed November 5, 1891. Serial No. 410,931. (No model.)

*To all whom it may concern:*

Be it known that I, DANIEL J. DAVIS, a citizen of the United States, residing at Chicago, in the county of Cook and State of Illinois, have invented certain new and useful Improvements in Centrifugal Cream-Separators, of which the following is a full, clear, and exact description, that will enable others to make and use the same, reference being had to the accompanying drawings, forming a part of this specification, in which—

Figure 1 is a vertical transverse section of a separator bowl embodying my improved features; and Fig. 2 a horizontal section on line 2, Fig. 1, looking in the direction indicated by the arrow.

This invention relates more especially to improvements in that class of centrifugal machines employed in creaming milk.

The invention consists in providing an improved bowl structure for use in such separators, and has for its object to increase the creaming capacity of the bowl without enlarging the dimensions thereof.

In the drawings, A represents a bowl having its greatest diameter at about the middle, the inclosing wall curving so as to present a structure having a rounded or swelled body with a gradually diminishing diameter in the direction of the top and bottom.

B represents the cone rising up in the center, and which is common to this class of bowls or drums.

The box or bearing-plug, C, inserted up in the chamber $a$ of the conical formation, is provided with the spherical seat $a'$ to receive the correspondingly shaped end of a vertical driving-spindle upon which the bowl is loosely seated.

The lower end of the vertical receiver-tube, D, is tightly inserted down through the apex of the cone and rests on the top of the bearing-box, C, which forms a bottom therefor. This tube receives the inflow of uncreamed milk, and stands rigidly in the center of the bowl, the upper open end terminating about flush with the open top thereof.

The upper end of the inlet-tube, E, opens into the lower end of the receiver and follows along down the exterior inclined wall of the cone; the lower end, turning inwardly, passes through the wall and opens into the bowl above the bottom. The liquid delivered into the receiver passes down the inlet-tube and is discharged into the bowl in front of the cream wall.

A tube, D, is rigidly secured to the interior surface of the inclosing wall and is curved to correspond to the shape of the bowl, as indicated by a dotted line in Fig. 1. The lower end of this tube opens at a point about where the diameter of the bowl is the greatest. The upper end of this tube leads into the passage $b$, in the contracted neck of the bowl, and opens out just under the rim $b'$.

In operation, the creamed milk will pass to the surface of the inclosing wall, enter the lower end of the exit-tube and be discharged out through the passage $b$. A regulating screw-plug, $b^2$, is inserted through from the outside neck of the bowl and projects into the milk-discharge-passage. By means of this screw, the area of the passage is enlarged or diminished, as may be required in gaging the outflow of the milk and cream volume with reference to each other. On the interior and at one side of the neck of the bowl is formed the projection G extending inwardly and provided with the chamber $d$, and the opening $d'$ in the upper side communicating with said chamber. A discharge orifice $d^2$ leads outwardly from said chamber through the inclosing wall. The cream as it rises after separation will flow into the chamber $d$ through the opening $d'$ and finally be discharged through the orifice $d^2$. The cream will not rise above the interior flange $d^3$, and the milk following the interior surface of the inclosing wall cannot again mingle with the cream or reach the opening entering the chambered projection from the upper side through which the cream is expelled. The two wings $g$ $g'$ are located diametrically opposite each other. The wing $g$ divides the inlet-tube from the milk-discharge-tubes, which are located on opposite sides, as shown in Fig. 2. The uncreamed milk is delivered into the bowl just in advance of the solid or imperforate wing $g$, and is, therefore, carried around at least one full revolution before any of the creamed milk can reach its escape-tube and pass out. The arrow indicates the direction in which the bowl is revolved. The wing $g'$ is perforated for the passage of the liquid therethrough, and serves to balance the bowl with reference to the companion wing.

Having thus described my invention, what I claim as new, and desire to secure by Letters Patent, is—

1. A separator bowl for centrifugal machines, the same having a central substantially conical bottom, a supply pipe opening into the upper end of said conical bottom, and a delivery tube leading from the end of the supply pipe down along the outer wall of the conical bottom and opening into the base of the separator bowl; substantially as described.

2. A separator bowl for centrifugal machines, the same having a substantially conical bottom, a supply pipe opening into the upper end of said conical bottom, a delivery tube leading from the end of the supply pipe down along the outer wall of the conical bottom and an opening into the separator bowl at the base, said bowl having a contracted neck provided with an inwardly extending chambered projection, said projection having an inlet into said chamber from the upper side of the same, and having also a discharge orifice leading outwardly from the chamber; substantially as described.

3. A separator bowl for centrifugal machines, the same having a contracted neck portion with an interiorly projecting rim-flange and provided with milk and cream discharge orifices, a milk tube leading from the point of greatest diameter of the bowl up along the interior wall to the milk discharge orifice, a chambered projection extending inwardly from the neck of the bowl, said projection having an inlet into said chamber from the upper side of the same under the rim flange, and having also a discharge orifice leading outwardly from said chamber; substantially as described.

In testimony whereof I affix my signature in presence of two witnesses.

DANIEL J. DAVIS.

Witnesses:
L. M. FREEMAN,
L. B. COUPLAND.